United States Patent [19]
Ballman

[11] 3,921,051
[45] Nov. 18, 1975

[54] BATTERY CHARGERS
[76] Inventor: Gray C. Ballman, 22 Mercury Blvd., P.O. Box 22, Chesterfield, Mo. 63017
[22] Filed: Jan. 30, 1975
[21] Appl. No.: 545,589

[52] U.S. Cl............................. 320/39; 320/DIG. 1
[51] Int. Cl.² .......................................... H02J 7/10
[58] Field of Search............ 320/DIG. 1, DIG. 2, 39, 320/40, 20, 21

[56] References Cited
UNITED STATES PATENTS
3,531,706 9/1970 Mullersman .................... 320/39 X
3,767,994 10/1973 Dittmar et al. .................... 320/39 X Primary Examiner—J. D. Miller
Assistant Examiner—Robert J. Hickey
Attorney, Agent, or Firm—Joseph A. Fenlon

[57] ABSTRACT

The disclosure relates to Battery Chargers which permit continuous application of AC power even during the use of the battery which function is accomplished by using SCR to control the negative return flow of charging current and by using three transistors in tandem, the first being operable only so long as AC power is presented to the charging device and the other two being regeneratively coupled together to cut off the operation of the SCR's when the battery is fully charged, the coupling of said three transistors being such that the operation of the transistors runs continuously on and off while the battery is charged, whereby to provide constant monitoring of the battery charged condition.

3 Claims, 1 Drawing Figure

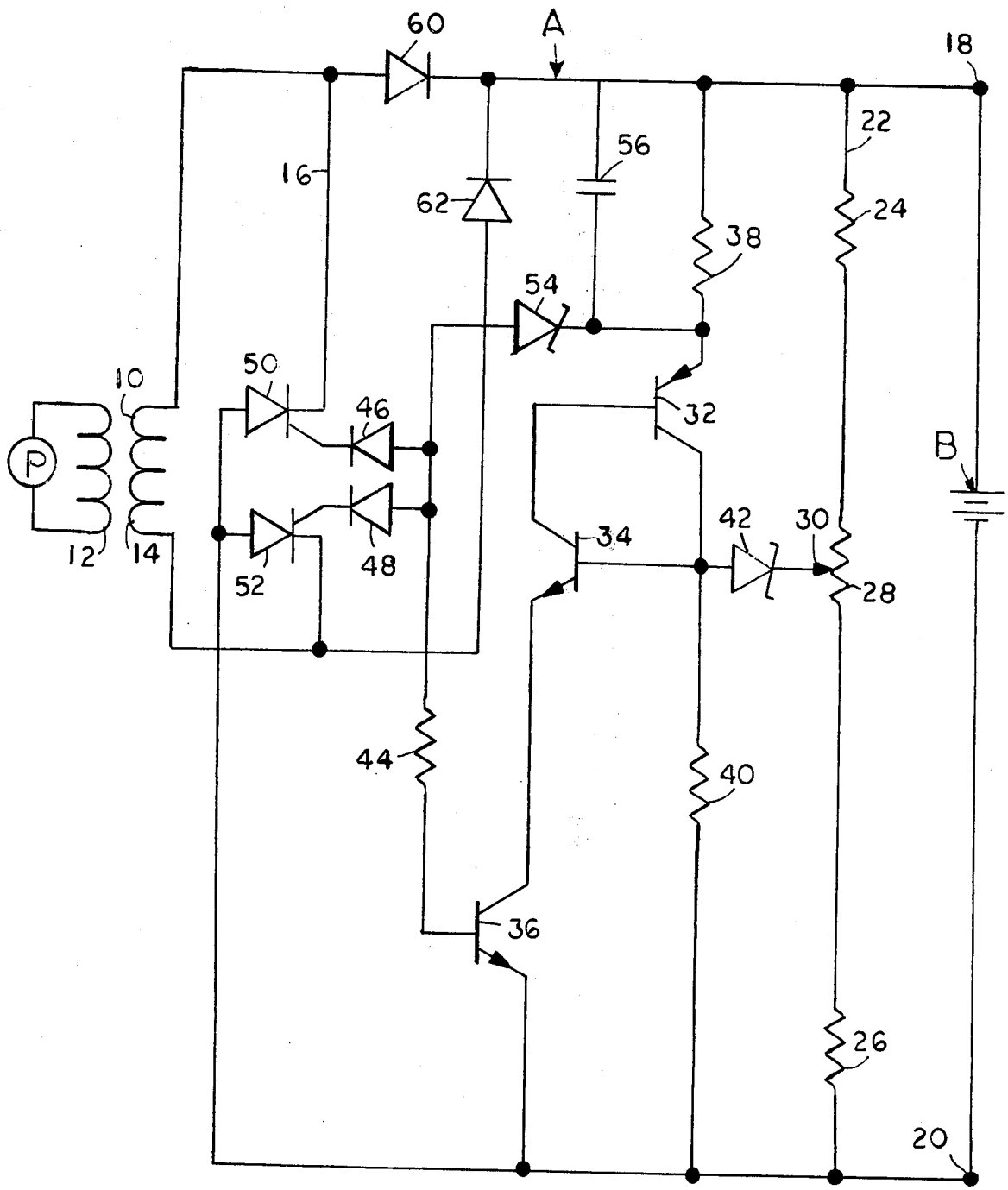

BATTERY CHARGERS

This invention relates to Battery Chargers.

It is the object of this invention to provide a battery charger which may be used in remote areas, which does not require personnel to operate, which may be continuously connected to a source of AC power and to the battery, and which provides a stable output voltage at the battery output terminals.

With the above and other objects in view, which will become immediately apparent upon the reading of this specification, my invention resides in the unique and novel form, arrangement, construction and combination of the various parts and elements herein shown, described and claimed.

IN THE DRAWINGS

The FIGURE is a detailed electrical schematic of the charger comprising my invention.

In the drawings, A represents a battery charger comprising a transformer 10 which has its primary winding 12 continuously connected to a source of AC power P and which has its secondary winding 14 connected to a control circuit 16 provided with a positive battery terminal 18 and a negative battery terminal 20 across which terminals a battery B is connected. Connected across the battery terminals 18, 20, is a voltage divider circuit 22 comprising two fixed resistors 24, 26, in series with a variable resistor 28 having a variable tap 30.

Also connected across the battery terminals 18, 20 as shown in the FIGURE are transistors 32, 34 and 36.

A resistor 38 is connected between the emitter of the transistor 32 and the positive battery terminal 18 and a resistor 40 is connected between the collector of the transistor 32 and the negative battery terminal 20. The base of the transistor 32 is connected to the collector of the transistor 34. The base of the transistor 34 is connected to the collector of the transistor 32 and to the cathode of a Zener diode 42, the anode of which is connected to the tap 30 of the variable resistor 28. The emitter of the transistor 34 is connected to the collector of the transistor 36. The emitter of the transistor 36 is connected to the negative battery terminal 20. The base of the transistor 36 is connected through a resistor 44 to the common anodes of diodes 46, 48.

Also connected to opposing terminals of the secondary winding 14 are the cathodes of a pair of SCRs 50, 52, the anodes of which are connected to each other and to the negative battery terminal 20. The gate leads of the SCR's 50, 52, are respectively connected to the cathodes of diodes 46, 48, respectively. A Zener 54 is located between the common cathodes of the diodes 46, 48 and the emitter of the transistor 32. A capacitor 56 is connected in parallel with the resistor 38. The circuit is completed by a first power diode 60 disposed between one terminal of the secondary winding 16 and the positive battery terminal 18, and by a second power diode 62 disposed between the other terminal of the secondary winding 16 and the positive battery terminal 18.

The operation is best understood when it is remembered that the charger A is particularly designed for maintaining charges on batteries at remote sites when personnel are seldom available to monitor the charge status of the battery but where maintaining the charge level of the battery is essential. In such instances, the charger A must be continuously connected to the source of AC power and to the battery B.

The charge status of the battery B is continuously represented by the voltage across terminals 18, 20, which voltage is also distributed across the voltage divider circuit 22. The tap 30 is positioned so that no voltage will be transferred from the voltage divider circuit 22 to the collector of the transistor 32 until the battery B is fully charged.

Transistor 36 is a resetting switch which turns itself on and off during each half cycle of AC power, the bias of transistor 36 being developed from the battery B through the resistor 38 and the Zener 54. Similarly voltage from the tap 30 is applied to the base of the transistor 34 and the collector of the transistor 32 through the Zener 42. Until such time as the battery is fully charged, the voltage at tap 30 will not be sufficient to cause the Zener 42 to pass sufficient voltage to turn on transistors 32 and 34, under such circumstances only transistor 36 will operate as explained above.

With transistors 32 and 34 not in conduction, negligible current flows through resistor 38 and the voltage presented to Zener 54 is sufficiently positive to pass "turn on" control voltage to the gate leads of SCR's 50 and 52 through diodes 46 and 48 respectively. This "turn on" voltage closes the negative power return circuit and permits full wave rectified charging power to flow through diodes 60 and 62 and the battery B.

When the battery B becomes fully charged, turn on voltage passes through Zener 42, whereupon transistors 32 and 34 go into regenerative conduction causing substantial amounts of current to flow through resistors 38 and 40 which in turn removes the "turn on" bias from the gate leads of SCR's 50 and 52, opening the negative return circuit for charging power and cutting off the charging operation of the charger. Capacitor 56 reduces drift.

It should be noted that the regenerative coupling of transistors 32 and 34 causes transistors 32, 34 and 36 to run continuously on and off while the battery is fully charged, thereby providing continuous voltage comparisons of the charged condition of the battery and further providing a substantially constant battery voltage.

It should be understood that changes, alterations and modifications in the form, construction, arrangement and combination of the various parts may be made and substituted for those herein shown and described without departing from the operation and principles of my invention.

Having thus described my invention, what I claim and desire to secure by Letters Patent is stated in the following claims:

I claim:

1. A battery charger for use in remote areas comprising a continuous source of alternating power, positive and negative output terminals across which a battery is connected, a voltage divider circuit across said output terminals and provided with a selectively variable voltage tap, rectifying means for converting the AC power to DC charging power and provided such DC power to said output terminals from said AC power source, first switching means for monitoring the voltage across the output terminals and including first and second transistors regeneratively coupled to each other, said first switching means being adapted for placing said first and second transistors in conduction when the voltage derived at the voltage tap attains a preselected magnitude, said first and second transistors being normally non-conducting, cutoff means for interrupting the flow of charging power when the first and second transistors are in conduction, and second switching means for interrupting at regular intervals the conduction of the first and second transistors whereby to provide a constant monitoring of the battery voltage.

2. The device of claim 1 wherein the first switching means includes a resistor in series with the emitter circuit of the first transistor, and the cutoff means includes an SCR having its anode and cathode in series with the DC current charging circuit and its gate lead operatively coupled to the positive battery terminal through a Zener diode and the first resistor whereby to provide a turn-on bias to the SCR while the first and second transistors are not in conduction and a cutoff bias to the SCR after the first and second transistor go into conduction and the voltage trap in the first resistor becomes substantial.

3. The device of claim 2 wherein the second switching means includes a third transistor operatively coupled to the AC power source and adapted for turning on and off once during each half cycle of AC power, and which has its emitter and collector in series with the emitters and collectors of the first and second transistors whereby to interrupt the flow of current through the first and second transistors each time the third transistor goes out of conduction.

\* \* \* \* \*